(12) United States Patent
Gimel et al.

(10) Patent No.: US 9,879,538 B2
(45) Date of Patent: Jan. 30, 2018

(54) BLANK CASTING FOR PRODUCING A TURBINE ENGINE ROTOR BLADE AND PROCESS FOR MANUFACTURING THE ROTOR BLADE FROM THIS BLANK

(71) Applicant: SNECMA, Paris (FR)

(72) Inventors: Alexandre Gimel, Conflans-Sainte-Honorine (FR); Arnaud Negri, Montgeron (FR); Denis Gabriel Trahot, Herblay (FR)

(73) Assignee: SNECMA, Paris (FR)

( * ) Notice: Subject to any disclaimer, the term of this patent is extended or adjusted under 35 U.S.C. 154(b) by 739 days.

(21) Appl. No.: 14/217,830

(22) Filed: Mar. 18, 2014

(65) Prior Publication Data

US 2014/0286777 A1    Sep. 25, 2014

(30) Foreign Application Priority Data

Mar. 19, 2013  (FR) ...................................... 13 52432

(51) Int. Cl.
*B23P 17/00* (2006.01)
*B23P 25/00* (2006.01)
(Continued)

(52) U.S. Cl.
CPC ................. *F01D 5/14* (2013.01); *F01D 5/30* (2013.01); *F01D 5/3015* (2013.01); *F01D 5/326* (2013.01);
(Continued)

(58) Field of Classification Search
CPC .......... F01D 5/14; F01D 5/3015; F01D 5/326; F01D 5/30; Y10T 29/49337;
(Continued)

(56) References Cited

U.S. PATENT DOCUMENTS 3,295,825 A   1/1967  Hall, Jr.
3,501,249 A   3/1970  Scalzo et al.
(Continued)

FOREIGN PATENT DOCUMENTS

EP   1 754 858 A2   2/2007
FR   2.028.539      10/1970
(Continued)

OTHER PUBLICATIONS

French Preliminary Search Report dated Jan. 16, 2014, in French Application No. 13 52432 filed Mar. 19, 2013 (with English Translation of Categories).

*Primary Examiner* — Sarang Afzali
*Assistant Examiner* — Darrell C Ford
(74) *Attorney, Agent, or Firm* — Oblon, McClelland, Maier & Neustadt, L.L.P.

(57) ABSTRACT

A blank casting for producing a turbine engine rotor blade, with a vane connected by a platform to a root, is provided. The root has an axial machining allowance intended to be removed by machining from each of its axial extremities. At least one of the axial extremities of the root includes at least one transverse channel that extends over the entire transverse width of the root and whose depth is greater than the machining allowance. A process for obtaining the blade by machining this blank casting is also provided.

4 Claims, 2 Drawing Sheets

(51) Int. Cl.
  *F01D 5/14* (2006.01)
  *F01D 5/30* (2006.01)
  *F01D 5/32* (2006.01)
  *B22D 11/126* (2006.01)
  *B22D 11/128* (2006.01)
  *B63H 7/02* (2006.01)
  *B23P 15/02* (2006.01)

(52) U.S. Cl.
  CPC .......... *B23P 15/02* (2013.01); *F05D 2230/10* (2013.01); *F05D 2230/21* (2013.01); *Y10T 29/49337* (2015.01)

(58) Field of Classification Search
  CPC ....... Y10T 29/49984; Y10T 29/499898; Y10T 29/49988; Y10T 29/49989; B23P 15/02; F05D 2230/10; F05D 2230/21; B22D 31/00
  USPC .................................... 416/223 R; 164/69.1
  See application file for complete search history.

(56) References Cited

U.S. PATENT DOCUMENTS

| | | | |
|---|---|---|---|
| 3,572,966 A | 3/1971 | Borden et al. | |
| 5,272,809 A * | 12/1993 | Robertson | B23K 20/233 228/194 |
| 5,299,353 A | 4/1994 | Nazmy et al. | |
| 6,416,282 B1 * | 7/2002 | Beeck | F01D 5/087 415/115 |
| 6,582,197 B2 * | 6/2003 | Coulson | B22C 7/02 164/122.1 |
| 7,507,075 B2 * | 3/2009 | Kang | F01D 5/147 416/248 |
| 8,790,083 B1 * | 7/2014 | Liang | F01D 5/186 416/97 R |
| 2004/0020049 A1 * | 2/2004 | Brock | B23P 15/02 29/889.7 |
| 2007/0036656 A1 | 2/2007 | Kang et al. | |
| 2009/0113708 A1 * | 5/2009 | Bamberg | B23K 20/1205 29/889.21 |
| 2009/0232660 A1 * | 9/2009 | Liang | F01D 5/187 416/97 R |
| 2010/0119364 A1 * | 5/2010 | Bunker | F01D 11/001 415/199.5 |
| 2012/0048430 A1 * | 3/2012 | Das | B21J 1/00 148/557 |
| 2012/0251331 A1 * | 10/2012 | Dietrich | F01D 5/147 416/97 R |
| 2013/0084191 A1 * | 4/2013 | Jiang | F01D 5/186 416/97 R |
| 2013/0294913 A1 * | 11/2013 | Campbell | F01D 5/16 416/145 |
| 2017/0074107 A1 * | 3/2017 | Neville | F01D 5/3007 |
| 2017/0096903 A1 * | 4/2017 | Schiessl | F01D 5/3007 |
| 2017/0114650 A1 * | 4/2017 | Snyder | F01D 5/3015 |

FOREIGN PATENT DOCUMENTS

FR  2 524 933  10/1983
GB  1 209 419  10/1970

* cited by examiner

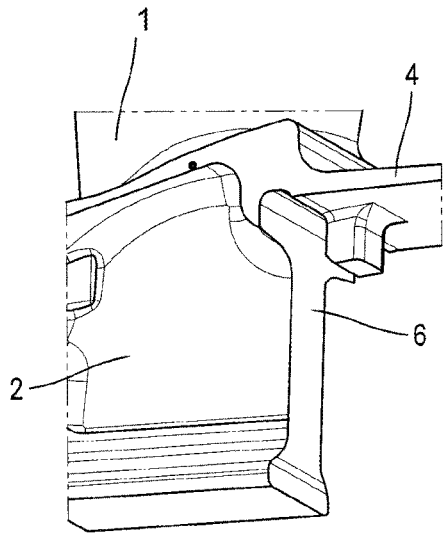
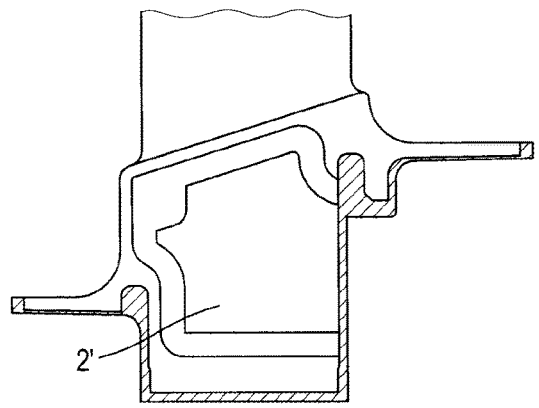
FIG. 2
Background Art
FIG. 3
Background Art
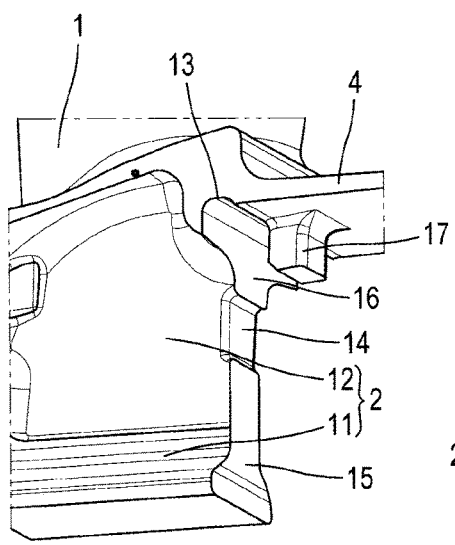
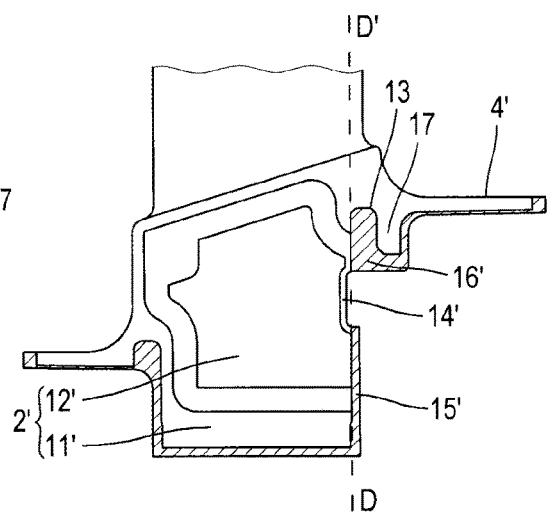
FIG. 4
FIG. 5

BLANK CASTING FOR PRODUCING A TURBINE ENGINE ROTOR BLADE AND PROCESS FOR MANUFACTURING THE ROTOR BLADE FROM THIS BLANK

TECHNICAL FIELD

The present invention relates to the field of turbine engine rotor blades and, more particularly, to the manufacture of these blades from blank castings.

PRIOR ART

Normally, rotors are found at the different stages of a turbojet engine, the fan, the compressors and the turbines. Holding the blades on the rotors and the seal between the stages are among the problems to be solved when these rotors and their blades are designed. The present application relates more particularly to the situation in which the blades are made individually and fixed to a disc to form the rotor.

In a low-pressure turbine, for example, with reference to FIG. 1, the parts that make up each blade are the vane 1, the root 2 that is used to fix the blade to the rotor disc 3, and the platform 4, which joins the vane 1 to the root 2 and forms the inner face of the aerodynamic duct at the vane. Each rotor disc 3 has at its periphery axial or oblique grooves in which the blade roots 2 are engaged. By convention, the terms "upstream" and "downstream" are defined in relation to the direction in which gases circulate in the turbojet engine. Likewise, as the blade is intended to be fitted to a rotor, its dimensional features are specified in relation to the axis 3a of the rotor and to the axial plane passing through its middle, when it is fitted. Thus, in FIG. 1, the upstream and downstream axial extremities of the root 2 of the blade correspond to the radial upstream face 5 and radial downstream face 6 of the root, which are approximately perpendicular to the axis of the rotor.

According to an arrangement known in the prior art, the roots 2 of the blades are held axially in an upstream and downstream direction by upstream 7 and downstream 8 annular retaining rings respectively, which are in axial abutment against the faces 5 and 6 of the roots 2 of the blades. It should be noted that these faces 5 and 6 are approximately level with the radial upstream and downstream faces of the rotor disc 3 receiving the root 2 of the blade.

According to a known technique, described in, among other places, patent applications FR 0958718 and FR 0854591, an upstream plate 9 and a downstream plate 10 fixed to the rotor come to bear against the upstream retaining ring 7 and downstream retaining ring 8 respectively, to ensure that they are correctly pressed against the radial faces of the roots and of the rotor disc. The seal from upstream to downstream at the blade roots is thus partly provided by the contact of the retaining rings 7, 8 against the radial faces of the blade roots and of the rotor disc.

To improve this seal, it has already been proposed that a retaining ring 8 extending over approximately the entire radial dimension of the root be fitted downstream of the blade roots. As can be seen in FIG. 2, the radial downstream face 6 of the root 2 of the blade against which the retaining ring 8 is intended to come to bear has a relatively large radial dimension.

Again according to the prior art, the blade is produced by machining a blank obtained by a casting process. This blank casting comprises a vane connected via a platform to a root whose axial extremities have machining allowances that are axial relative to the final dimensions of the blade. As the outline of the final blade is shown inside the outline of the blank in FIG. 3, the machining allowances of the blank casting are indicated by hatchings. These machining allowances are generally removed by machining, to a relatively low tolerance of +/−0.05 mm.

However, the radial dimension of the downstream face 6 of the blade root is relatively large, so much so that it is only with difficulty that this face can be produced by machining the corresponding machining allowance in accordance with the above-mentioned tolerance. This is because the machining length (radial dimension) is too great, which poses a problem in complying with the required tolerance of +/−0.05 mm. The production of a blade as shown in FIG. 2 by machining a blank casting to a tolerance of +/−0.05 mm is therefore difficult to achieve using the state of the art.

The aim of the invention is to solve this problem in a simple, effective and economical manner.

PRESENTATION OF THE INVENTION

The invention relates to a blank casting that has a vane connected via a platform to a root, for producing a turbine engine rotor blade that has a vane connected via a platform to a root intended to be inserted in the rotor following the direction of the axis of the rotor, this axis defining an axial direction and a radial direction for the components of the blade with reference to the position of the blade on the rotor, at least one of the axial extremities of the blade root having to follow an approximately transverse plane of contact in order to provide a seal by pressure against a component of the turbine engine, said root of the blank having an axial machining allowance intended to be removed by machining from each of its axial extremities, characterised in that the axial extremity of the root of the blank corresponding to the axial extremity of the root of the blade that has to follow said plane of contact comprises at least one transverse channel which extends over the entire width or transverse dimension of the root and whose depth is greater than the value of the machining allowance relative to the position of said plane of contact, so as to improve the precision of machining on the face or faces of the blade root in the plane of contact.

The transverse channel makes it possible to limit the radial extent of the machining allowance to be machined and thus to facilitate this machining while remaining within a predetermined tolerance, for example a tolerance of +/−0.05 mm. After machining, the bottom of the channel is set back from the plane of contact with the retaining ring mentioned above. The depth of this channel means that any irregularities in the bottom do not interfere with the bearing of the retaining ring against the axial extremity of the blade root.

Advantageously, the transverse channel is situated at a distance from the platform and from the radially inner extremity of the root. The transverse channel thus separates the axial extremity of the root into two parts with machining allowances that are easier to machine to the tolerance mentioned above.

Preferably, the blank casting comprises, between the transverse channel and the platform, a block of material in which it is intended that a channel is machined for receiving a retaining ring for the blade.

This block is useful in the machining process for producing a pin on the inner radial surface of the platform, opposite the corresponding axial extremity of the blade root. The block is also machined to produce a face of the axial extremity of the root, this face being situated radially outside the transverse channel. The face of the pin that is directed towards the face of the corresponding radial extremity enables the radial extension of the channel for receiving the pin to be extended. This channel is hollowed out of the platform and in continuity with the face of the axial extremity of the root, which improves the clamping of the retaining ring.

Advantageously, the root has a bulb which is connected to the platform by a stilt, and the transverse channel mentioned above is situated at an axial extremity of this stilt.

This arrangement makes it possible to eliminate as little material as possible from the final blade and therefore to avoid weakening it, whilst significantly reducing the surfaces to be machined.

The invention also relates to a process for manufacturing a turbine engine rotor blade, with a vane connected via a platform to a root intended to be inserted in the rotor following the direction of the axis of the rotor, this axis defining an axial direction and a radial direction for the components of the blade with reference to the position of the blade on the rotor, the blade root having at least one axial extremity that must follow an approximately transverse plane of contact and which is intended to provide a seal by pressure against a component of the turbine engine, said process comprising the production of a blank casting according to the features described above and a step that consists of machining said axial extremity of the root of the casting that has the transverse channel in such a way as to eliminate the machining allowance relative to the position of said plane of contact, in order to improve the precision of machining on the face or faces of the blade root in the plane of contact.

Advantageously in this process, the machining allowance is eliminated by machining the parts of the axial extremity of the root situated, respectively, radially inside and outside the channel.

Preferably, the machining of the radially inner and outer parts is carried out with a single tool, such as a grinding wheel.

Preferably again, the machining is carried out by grinding. This process makes it possible, in a known manner, to achieve the tolerances required to maintain the planarity of the faces of the downstream extremity of the blade that are intended to be in contact with the retaining ring.

In a variant of the process, the machining of the radially inner part is carried out before the machining of the radially outer part, in a single machining operation.

Advantageously, the machining causes at least two transverse coplanar faces separated by said transverse channel to appear on said axial extremity of the blade root.

DESCRIPTION OF AN EMBODIMENT OF THE INVENTION

The present invention will be better understood and its other details, features and advantages will appear more clearly on reading the description that follows, with reference to the appended drawings, in which:

FIG. 2 is a downstream perspective view of the root of a blade according to the prior art;

FIG. 3 is a view in radial cross-section of a blank casting and of the machining allowances of this blank that are to be machined, in order to produce a rotor blade according to the prior art;

FIG. 4 is a downstream perspective view of the root of a blade produced according to the invention;

FIG. 5 is a view in radial cross-section of a blank casting and of the machining allowances of this blank that are to be machined, in order to produce a rotor blade according to the invention.

Figure 1:
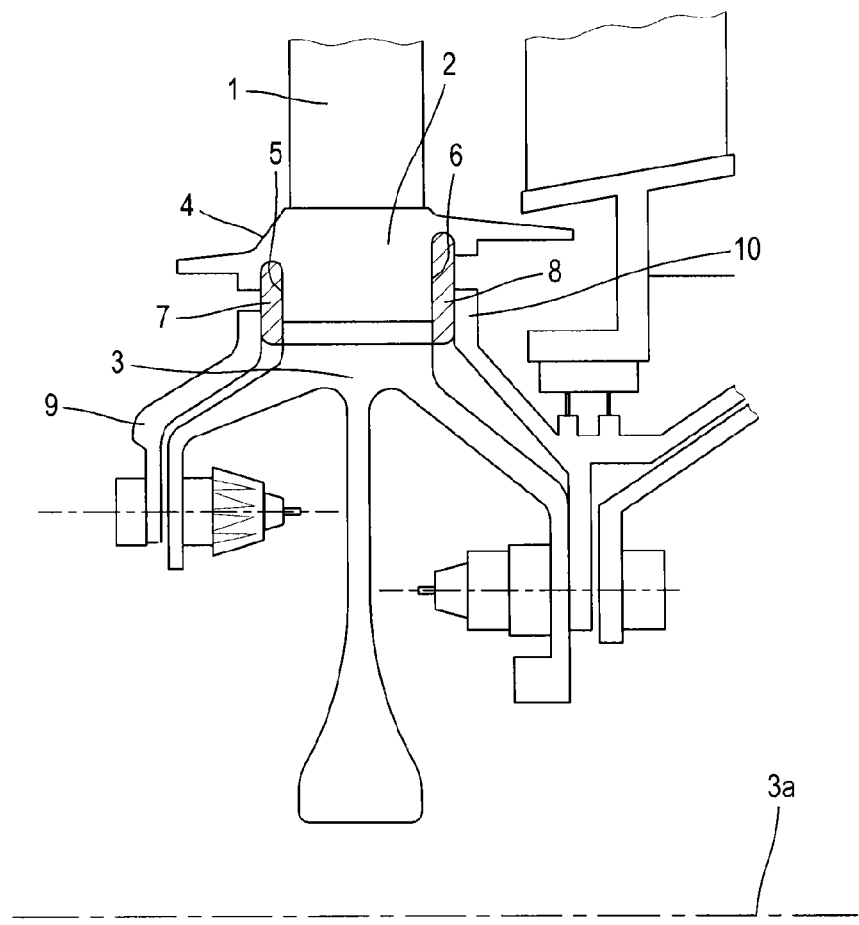
FIG. 1 is a view in radial cross-section of a rotor disc of a gas turbine engine according to the prior art.

The axial and radial directions are understood relative to the axis of the rotor, the terms inner and outer are understood relative to the radial direction, and the terms above, below, extend down, rise are understood relative to the orientation shown in FIGS. 2 to 5.

The invention is presented for the downstream extremity of the root of a low-pressure turbine blade of a gas turbine engine but could be applied to the upstream extremity of this root.

The root 2 of the blade shown in FIG. 4 is of the dovetail type and comprises a bulb 11 connected via a stilt 12 to the blade platform 4.

The implementation of the invention is based on the fact that it is not necessary for the downstream extremity of the blade root 2 to be in contact over its entire radial extension with the retaining ring 8 described above. The downstream extremity of the root 2 has a transverse channel 14, visible in FIG. 4, which extends over the entire width or transverse dimension of the root and which defines on this downstream extremity two plane radial faces 15, 16, the radially inner and outer faces respectively. These faces 15, 16 are intended to form a jointing contact with the downstream retaining ring 8 in order to provide an axial seal.

The radial face 15 situated below the inner radial edge of the channel 14 runs as far as the inner radial extremity of the root 2. The radial face 16, situated above the outer radial edge of the transverse channel 14, is connected to a channel 13 for receiving the retaining ring 8, made radially in the platform 4 and intended to receive the outer radial edge of the retaining ring 8. The two faces 15 and 16 are situated in a single transverse plane. This plane corresponds to the surface of the retaining ring 8 which bears against the faces 15 and 16 of the root 2, when the blade is fitted onto the rotor disc 3 in the turbine engine.

In addition, this blade has a pin 17 positioned so that it projects radially below the inner surface of the platform 4, downstream and at a distance from the downstream extremity of the root 2. The upstream radial face of this pin 17, opposite the face 16, is situated in continuity with a wall of the retaining channel 13 in the platform 4. This pin 17 helps to give the receiving channel 13 a larger radial extension and to provide better clamping of the retaining ring 8.

It should be noted that the stilt 12 of the blade root 2 has an approximately plane part, whose thickness is less than the width or transverse dimension of the bulb 11 and of the platform 4 to which it connects. The channel 14 made in the downstream extremity of the root 2 is situated approximately in the middle of this extremity, at the stilt 12. The channel 14 is thus situated in the zone where the downstream extremity of the root 2 is narrowest transversely. This channel 14 is oriented in a direction approximately perpendicular to the radial direction and it leads laterally to the two opposed faces of the stilt 12 adjacent to the downstream extremity. The profile of the channel 14 along the radial cross-section is constant and is approximately U-shaped. The bottom of the channel 14 is flat and it is connected to the faces 15 and 16 by portions of cylindrical surfaces whose axis is perpendicular to the axial plane of the blade root 2. The depth of the channel 14 in the axial direction is therefore constant, its value being, for example, included in the range between 1 and 2 mm.

To arrive at this result, the implementation of the invention consists of organising the casting process so as to obtain a casting that has a root 2' with a transverse channel 14' at one of its axial extremities. In FIG. 5, the outlines of the blank casting are shown surrounding the outlines of the final blade, after machining. The machining allowances (indicated by hatchings) that are intended to be removed by machining can be seen between the two outlines. The line DD' of the transverse plane that will be the plane of contact with the retaining ring 8 on the blade has also been shown.

The downstream extremity of the root 2' of the blank consists of three parts:
- a median part set back from the line DD' forming a transverse channel 14' extending over the entire width of this extremity;
- a radially inner part 15' situated between the radially inner edge of the transverse channel 14' and the radially inner extremity of the root 2';
- and a radially outer part 16' situated between the radially outer edge of the transverse channel 14' and the platform 4'.

Like the final blade, the root 2' has a bulb 11' and a stilt 12' which connects it to the platform 4'. The channel 14' of the blank casting is positioned radially in the same place as the channel 14 of the final blade, at the stilt 12'. It extends depthwise in an axial direction upstream of the line DD' of the plane of contact. The form that it takes upstream of this plane is the form that has already been described for the channel 14 of the blade. On the basis of this shape, the channel 14' of the blank connects with some surfaces of the parts 15' and 16' of the downstream extremity of the root 2'.

The radially inner part 15' of the downstream extremity of the root 2' has, relative to the line DD' of the plane of contact, an axial machining allowance that is intended to be machined by grinding, using a grinding wheel for example, in order to obtain the radial face 15.

This machining allowance is, for example, of the order of a few tenths of a millimeter. The depth of the channel 14' of the blank is greater than the axial machining allowance produced on the part 15' of the downstream extremity of the root 2'.

The radially outer part 16' of the downstream extremity 2' takes the form of a block of material 16' intended to be machined to produce the pin 17, the retaining channel 13, and the radial outer face 16.

The downstream extremity of the root 2' of the blank is machined, preferably by grinding, to make the faces 15, 16, the channel 13 and the pin 17 appear.

In the implementation presented, the pin 17 extends down radially to a position close to that of the outer radial edge of the channel 14. In a case where this pin 17 does not extend down as low relative to the outer edge of the channel 14, it is possible to produce a variant embodiment in which the radially outer part 16' of the downstream extremity comprises a part adjacent to the transverse channel 14' and having the same machining allowance as the radially inner part 15'.

The embodiment presented above situates the transverse channel 14' in a position, in the downstream extremity of the root 2' of the blank, which is the most advantageous given the shape of the root. Of course, it is within the scope of the invention to situate this channel in other places or to make a plurality of channels, if the configuration of the root justifies doing so. In fact, it is particularly important to leave parts with a machining allowance which, after machining, will form bearing surfaces at an extremity, firstly on the bulb 11 and, secondly, in contact with the platform 4 to enable the blade to be held in position properly.

In another variant, the plane of contact, shown by the line DD' in the plane of axial cross-section in FIG. 5, which delimits the downstream extremity of the blade can be angled slightly, by +/−15°, around the transverse plane in a radial direction. For this reason, it is important that the blade is locked in the axial direction, but a slightly inclined shape of the surface performs this function while allowing, for example, the shape of the retaining ring to be adjusted.

The invention claimed is:

1. A blank casting comprising:
a vane connected via a platform to a root, the blank casting for producing a blade of a turbine engine rotor that includes a blade vane connected via a blade platform to a blade root intended to be inserted in the turbine engine rotor following a direction of an axis of the turbine engine rotor, the axis defining an axial direction and a radial direction perpendicular to the axial direction for components of the blade with reference to a position of the blade on the turbine engine rotor, an axial extremity of the blade root having to follow an approximately transverse plane of contact in order to provide a seal by pressure against a component of the turbine engine rotor, the axial extremity of the blade root including a transverse channel, a radially inner plane radial face radially below the transverse channel, and a radially outer plane radial face radially above the transverse channel, the radially inner plane radial face and the radially outer plane radial face being coplanar with the approximately transverse plane of contact, the blade further including a single pin projecting radially below an inner surface of the platform and at a distance downstream from the axial extremity of the blade root, an upstream radial face of the pin being opposite of the radially outer plane radial face and in continuity with a wall of a retaining channel provided in the blade platform,
wherein an axial extremity of said root of the blank casting includes an axial machining allowance intended to be removed by machining, the axial extremity of the root of the blank casting corresponding to the axial extremity of the blade root of the blade that has to follow said approximately transverse plane of contact comprises:
a transverse channel which extends over an entire width in a transverse dimension of the root of the blank casting, a depth of the transverse channel being greater than a value of the machining allowance relative to the transverse position of said approximately transverse plane of contact over the entire width of the transverse channel,
a radially inner part situated between a radially inner edge of the transverse channel and a radially inner extremity of the root, and
a radially outer part situated between a radially outer edge of the transverse channel and the platform, the radially outer part including a block of material intended to be machined to produce the pin and the retaining channel, and
wherein the pin and the retaining channel of the blade extend radially only on one side of the blade platform.

2. The blank casting according to claim 1, wherein the root of the blank casting has a bulb which is connected to the platform of the blank casting by a stilt, said transverse channel being situated at an axial extremity of the stilt.

3. The blank casting according to claim 1, wherein a free end of the blade platform on a side of the blade platform with the pin and the retaining channel extends beyond the radially outer part of the axial extremity of the root of the blank casting in the axial direction.

4. A blank casting comprising:
a vane connected via a platform to a root, the blank casting for producing a blade of a turbine engine rotor that includes a blade vane connected via a blade platform to a blade root intended to be inserted in the turbine engine rotor following a direction of an axis of the turbine engine rotor, the axis defining an axial direction and a radial direction perpendicular to the axial direction for components of the blade with reference to a position of the blade on the turbine engine rotor, an axial extremity of the blade root having to follow an approximately transverse plane of contact in order to provide a seal by pressure against a component of the turbine engine rotor, the axial extremity of the blade root including a transverse channel, a radially inner plane radial face radially below the transverse channel, and a radially outer plane radial face radially above the transverse channel, the radially inner plane radial face and the radially outer plane radial face being coplanar with the approximately transverse plane of contact, the blade further including a single pin projecting radially below an inner surface of the platform and at a distance downstream from the axial extremity of the blade root, an upstream radial face of the pin being opposite of the radially outer plane radial face and in continuity with a wall of a retaining channel provided in the blade platform,
wherein an axial extremity of said root of the blank casting includes an axial machining allowance intended to be removed by machining, the axial extremity of the root of the blank casting corresponding to the axial extremity of the blade root of the blade that has to follow said approximately transverse plane of contact comprises:
a transverse channel which extends over an entire width in a transverse dimension of the root of the blank casting, a depth of the transverse channel being greater than a value of the machining allowance relative to the transverse position of said approximately transverse plane of contact over the entire width of the transverse channel,
a radially inner part situated between a radially inner edge of the transverse channel and a radially inner extremity of the root, and
a radially outer part situated between a radially outer edge of the transverse channel and the platform, the radially outer part including a block of material intended to be machined to produce the pin and the retaining channel, and
wherein the radially inner part of the blank casting is radially separated from the radially outer part of the blank casting by the transverse channel.

* * * * *